Feb. 3, 1942.　　　　C. G. ANASTOR　　　　2,272,105
MANUFACTURING DROPPER
Filed Aug. 3, 1940　　　　4 Sheets-Sheet 1
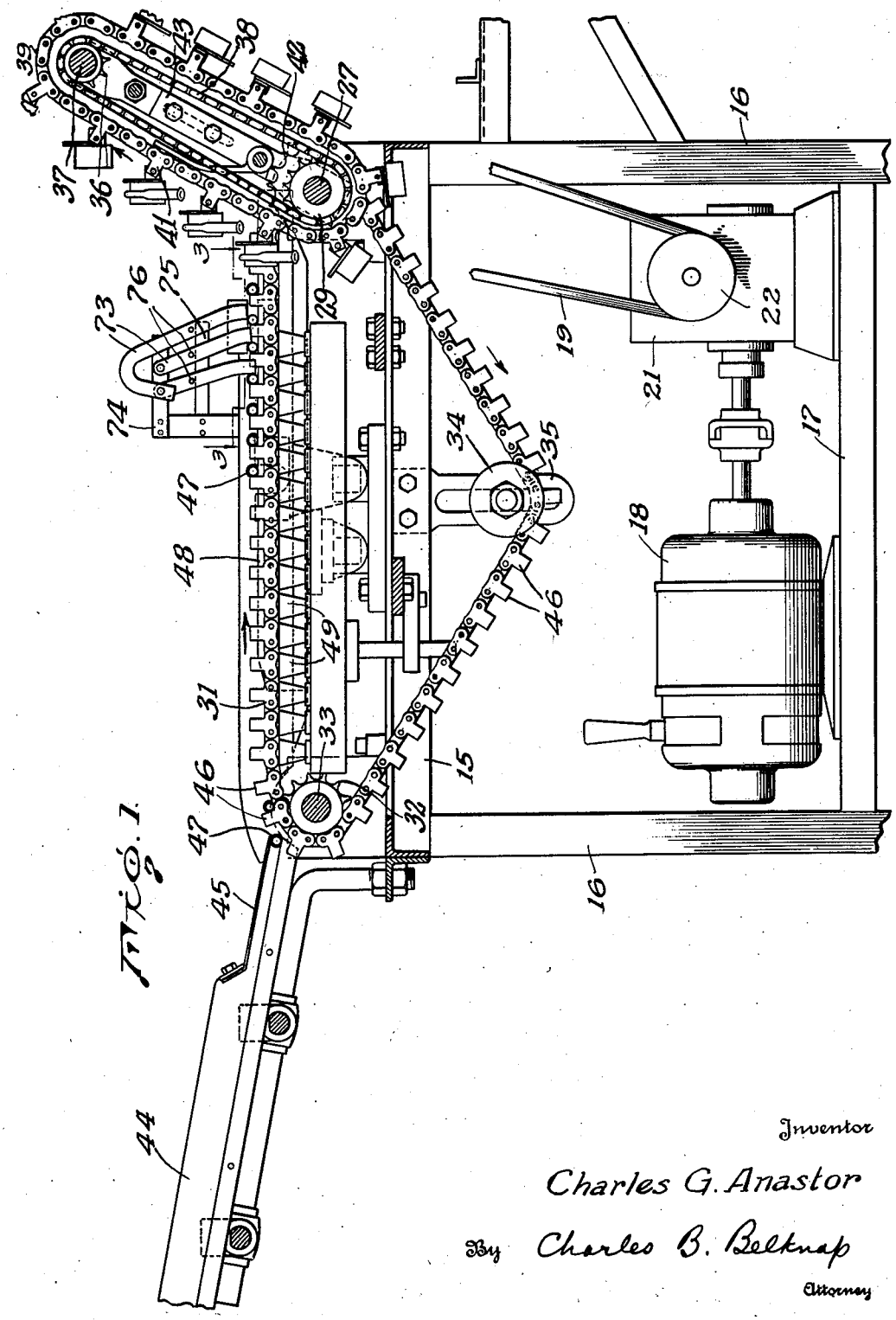
Inventor
Charles G. Anastor
By Charles B. Belknap
Attorney

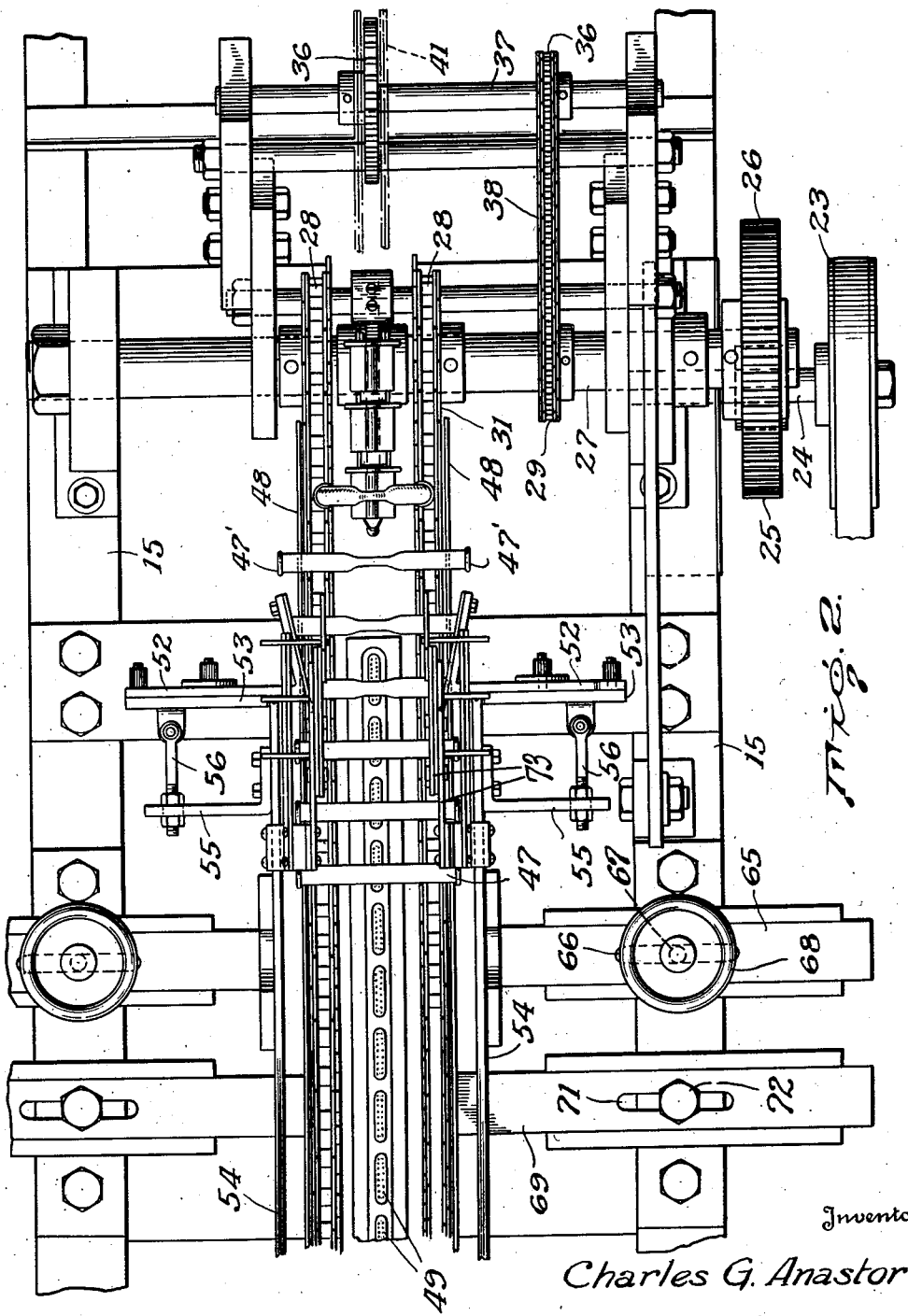

Feb. 3, 1942.  C. G. ANASTOR  2,272,105
MANUFACTURING DROPPER
Filed Aug. 3, 1940   4 Sheets-Sheet 3
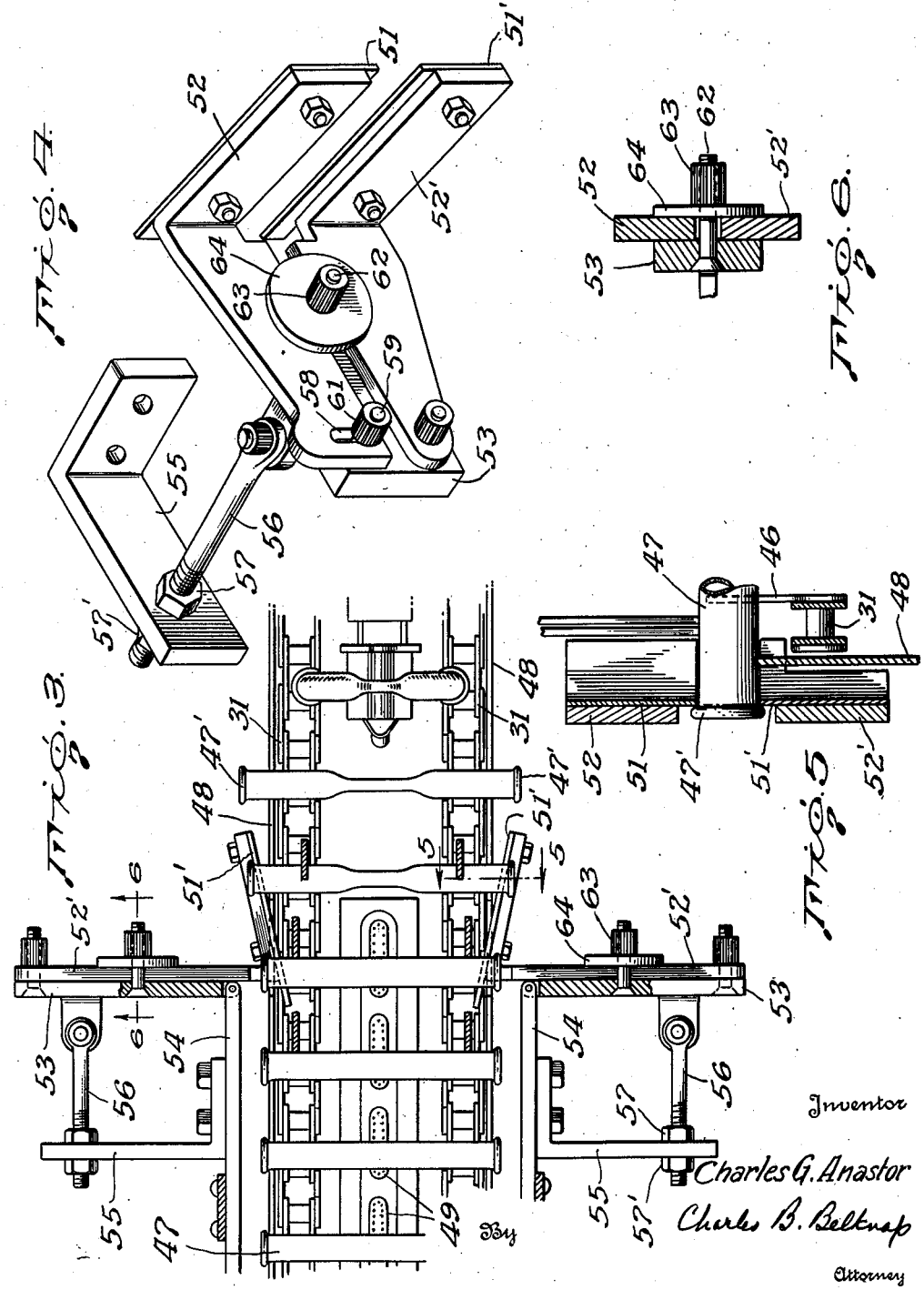

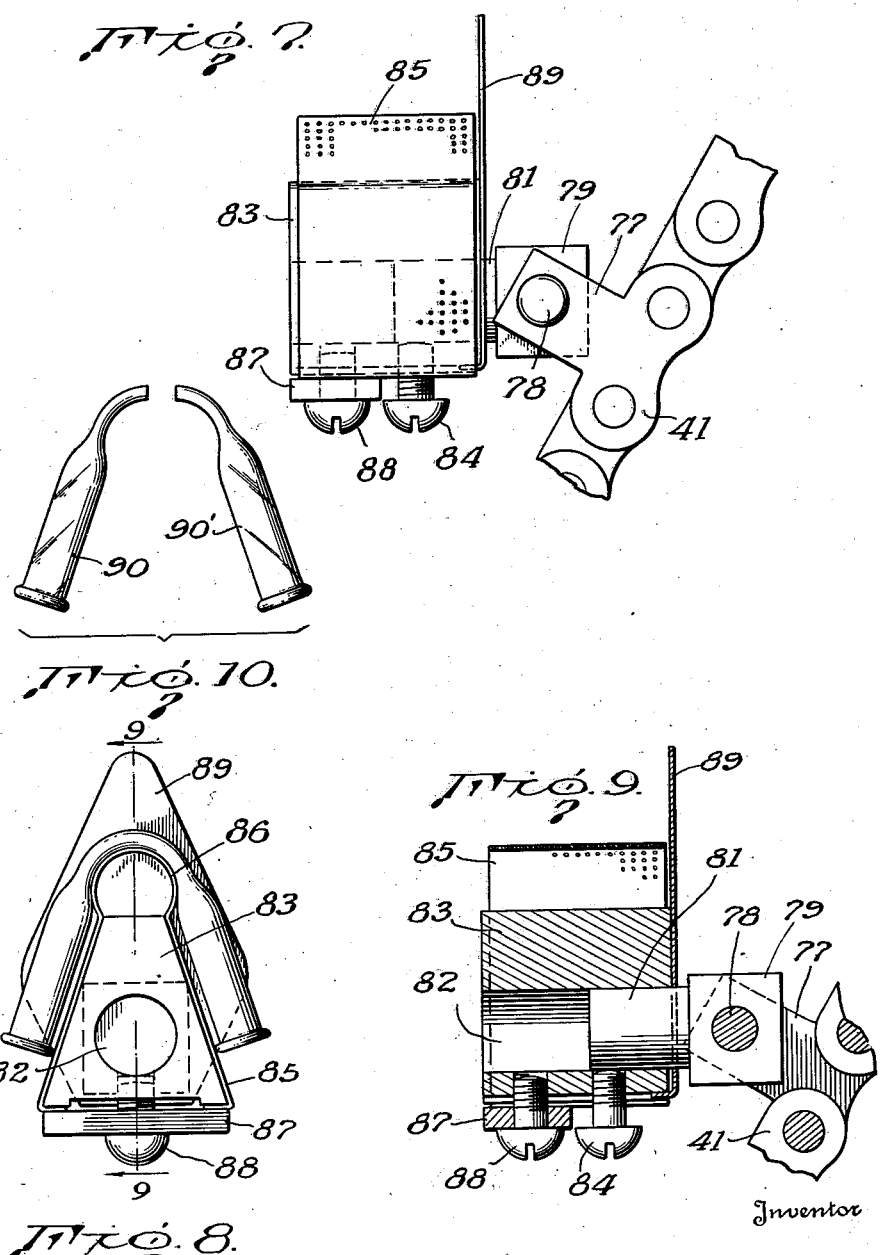

Patented Feb. 3, 1942

2,272,105

UNITED STATES PATENT OFFICE 2,272,105

MANUFACTURING DROPPER

Charles G. Anastor, Vineland, N. J., assignor to Kimble Glass Company, Vineland, N. J., a corporation of Illinois Application August 3, 1940, Serial No. 351,005

11 Claims. (Cl. 49—7)

The present invention relates to the manufacture of medicine droppers of the type having a curved or angular discharge end, and more particularly to a machine for reducing and bending tubular glass blanks to produce droppers of the aforesaid character.

One of the objects of the invention is to form from a tubular glass blank two similarly shaped droppers, each having a reduced discharge end portion, this reduced portion being offset axially with respect to the axis of the main body of the dropper.

Another object of the invention is the provision of a novel conveyor which carries a plurality of blanks past heating flames, then stretches a heated portion of each blank, and finally supports the blank, while still plastic, in such a manner that the blank is bent to the desired form.

Other objects will be apparent from the following description of a preferred embodiment of the invention taken in connection with the accompanying drawings in which:

Fig. 1 is a side elevation of a machine illustrating a preferred arrangement of mechanisms for shaping blanks to produce droppers;

Fig. 2 is a partial top plan view of the machine shown in Fig. 1;

Fig. 3 is an enlarged fragmentary section of a portion of the machine taken on the line 3—3 of Fig. 1, illustrating the stretching and bending devices;

Fig. 4 is a perspective view of one part of the stretching mechanism;

Fig. 5 is a section taken on the line 5—5 of Fig. 3;

Fig. 6 is a section taken on the line 6—6 of Fig. 3;

Fig. 7 is a side view of a support on which a blank is bent showing its relation to a conveyor chain;

Fig. 8 is a front view of the support shown in Fig. 7;

Fig. 9 is a section taken on line 9—9 of Fig. 8; and

Fig. 10 illustrates a pair of finished droppers after they have been shaped and separated.

In the drawings, the machine is shown as mounted on a rectangular frame 15 supported on legs 16. Sub-frame 17 supports a motor 18 which drives belt 19 through a reducer indicated at 21 and pulley 22. Belt 19 drives pulley 23 fast on shaft 24 to which is also secured gear 25, the latter meshing with gear 26 on shaft 27. Keyed to shaft 27 are sprockets 28 and 29. Conveyor chain 31 is driven by sprocket 28, the chain also meshing with sprocket 32 loose on shaft 33 and being held taut by idler 34 adjustably mounted on bracket 35 on the underside of frame 15. Sprocket 36 fast on shaft 37 is driven by sprocket 29 and chain 38, shaft 37 also having keyed thereto sprocket 39, the latter driving an inclined chain conveyor 41 which passes over loose sprocket 42 on shaft 27. It is to be noted that shaft 37 is mounted in a pair of arms 43 disposed angularly with respect to frame 15.

Supported forwardly of the frame of the machine is an inclined magazine 44 at the discharge end of which is a resilient finger 45 which permits glass blanks to roll into proximity of the path of conveyor chain 31. Each of adjacent links of chain 31 is provided with an outwardly projecting finger 46 adapted to engage a blank 47, remove it from the magazine, and convey the blank along rails 48 and over burners 49 arranged medially of the conveyor chains and longitudinally of the machine. The burners heat the blanks intermediate their ends sufficiently to plasticize the middle portion of each blank.

Each of the glass blanks is provided at each end thereof with a lip 47'. After the blanks have been subjected to a softening heat, the lips are engaged by a drawing or stretching device seen in Figs. 3, 4, and 5. This device consists of opposite diverging pairs of plates comprising upper and lower guides 51, 51' which cause the lipped ends of the blanks to move away from each other transversely of the path of the conveyor, thus stretching the softened middle portion of each blank and at the same time reducing the diameter of this middle portion. Guides 51, 51' are secured to brackets 52, 52' which in turn are adjustably secured to plates 53 pivoted to adjustable side members 54. Also fixed to members 54 are L-shaped brackets 55 apertured to receive links 56 each of which is threaded at one end and pivoted at its other end to one of the plates 53. Nuts 57, 57' engage opposite sides of bracket 55 and may be fixed to adjust the angularity of pivoted plate 53 and, consequently, that of guides 51, 51' to vary the angle of divergence of the guide plates. In this way the amount of stretch or lengthening of the softened portion of the blanks may be accurately controlled, it being obvious that the ends of the guides are moved laterally as the angularity of divergence is modified.

The guides 51, 51' are also adjustable vertically with respect to each other to accommodate blanks of various diameters. As shown in Fig. 4, the upper bracket is provided with a vertical slot 58 through which pin 59 on bracket 52 projects, the pin being threaded to receive nut 61. Bracket 52 also carries a threaded pin 62 accommodating nut 63 and washer 64. It will be apparent that, by loosening nuts 61 and 63, the upper bracket may be adjusted with respect to the lower bracket, and, by tightening the nuts, the relation of the guides are maintained. The space between the guides is slightly greater than the diameter of the blanks but less than that of the lips and, since the lips are disposed outwardly of the guides, they are moved apart thereby.

Side members 54 are secured to bars 65 each slotted at 66 to receive a threaded bolt 67 having thereon a hand wheel 68. Bolt 67 is threaded into frame 15. The side members are thus adjustable laterally to provide for blanks of varying lengths. Rails 48 are likewise adjustable laterally, being secured to bars 69 slotted at 71 and held to the frame by headed bolts 72. The rails are preferably spaced a distance apart slightly less than the distance between the lips on the cold blanks so that the lips overlap the outer faces of the rails. Hence the blanks are constrained to move in a definite path so that they are softened exactly at their middle portions as they pass over the softening flames.

When the blanks become soft, they tend to sag, the cold end tilting upwardly unless held against the supporting rails. To obviate sagging there are provided a plurality of weighting fingers 73 on each side of the conveyor chain 31 adjacent the ends of the blanks. As will be seen in Figs. 1 and 2, these fingers are pivoted at their upper ends to brackets 74, each of the brackets having a projecting arm 75 to limit the downward swing of the fingers. The weight of the fingers is sufficient to hold the ends of the blanks against the supporting rails to prevent the heated blanks from sagging. They furthermore act as a drag to insure accurate spacing of the blanks by urging them against the fingers on the conveyor chains.

As the softened blanks near the end of their travel on the horizontal conveyor 31, they are engaged and lifted by the following mechanism. Oppositely spaced links on the chain 41 of the inclined conveyor are provided with apertured fingers 77. Pins 78 passing through these fingers and through connector members 79 are threaded or otherwise arranged to clamp the members between opposite fingers. The members 79 each has formed integral therewith a cylindrical lug 81 adapted to be seated in bore 82 in a block 83, the latter being substantially trapezoidal in cross section. Set screw 84 holds the block to the connector. Secured to block 83 is a perforated supporting plate 85 having inclined sides meeting at an acute angle, i. e., it is substantially V-shaped but is partially cylindrical at its apex, as indicated at 86. The ends of the plate are bent inwardly and are clamped against block 83 by cross-piece 87 and screw 88. Since sprocket 42 is disposed somewhat below the horizontal traverse of conveyor chain 31, each of the plates 85 in its upward travel will engage a softened blank and lift it from the horizontal conveyor. The timing of the conveyors is such, of course, that the upper curved face of one of the plates 85 engages a blank at a time when the blank is directly over the plate. Furthermore, the speed of the inclined conveyor is such that its horizontal component is preferably substantially equal to the rate of travel of the horizontal conveyor.

As shown in Fig. 8, the softened middle portion of the blank bends when the blank is lifted above the horizontal conveyor, the cold ends of the blank being of sufficient weight to fall to the sides of the supporting plate. The blank thus takes a substantial V-shape with the apex thereof being regularly curved. Due to the perforations in the plates 85 and the length of the inclined conveyor 41, the blanks will cool sufficiently before they reach the upper limit of their vertical travel to set and conform to the shape shown in Fig. 8. Back plate 89 on block 83 prevents displacement of the blanks until they reach the opposite side of conveyor 41 at which time they fall by gravity into a suitable receiver provided at an appropriate position with respect to the conveyor. A subsequent operation halves the bent blank substantially at the middle of the bent portion thereof to provide two droppers indicated at 90, 90' in Fig. 10.

While a preferred form of the invention has been illustrated and described, it is not intended that it be confined to the particular arrangement of parts referred to herein, but may be of various forms and limited only by the definition thereof contained in the appended claims.

Having described my invention, what I claim as new and desire to secure by Letters Patent is:

1. A machine for shaping glass droppers to form thereon offset discharge ends comprising heating means for softening a portion of a tubular blank intermediate the ends thereof, means for drawing the softened portion of the blank to reduce the diameter of the middle thereof, and means for engaging the softened reduced portion of the blank to effect relative movement of said reduced portion transversely with respect to the ends of the blank to form a V-shaped blank.

2. A machine for shaping glass droppers to form thereon offset discharge ends comprising heating means for softening a portion of a tubular blank intermediate the ends thereof, means for conveying the blank in a definite path past said heating means, diverging guide means engageable with the ends of the blanks for drawing the softened portion of the blank to reduce the diameter of the middle thereof, and means positioned in the path of said blanks for engaging the softened reduced portion of the blank to effect relative movement of said reduced portion transversely with respect to the ends of the blank to form a V-shaped blank.

3. A machine for shaping glass droppers to form thereon offset discharge ends comprising heating means for softening a portion of a tubular blank intermediate the ends thereof, means for conveying the blank in a definite path past said heating means, drawing means positioned in the path of the conveyed blank and engageable with the blank to stretch the softened portion thereof, means engageable with the softened portion of the blank to bend said softened portion, and means for moving said bending means in a path which intersects the path of said conveying means.

4. A machine for shaping glass droppers to form thereon offset discharge ends comprising heating means for softening a portion of a tubular blank intermediate the ends thereof, means for conveying the blank in a horizontal path past said heating means, drawing means for stretching the softened portion of the blank to reduce the diameter of the middle thereof, means engageable with the softened reduced portion of the blank to bend said softened portion, and means for moving said bending means in a vertical path when said bending means is in engaging relation to said blank.

5. A machine for shaping glass droppers to form thereon offset discharge ends comprising heating means for softening a portion of a tubular blank intermediate the ends thereof, means for conveying the blank in a horizontal path past said heating means, drawing means for stretching the softened portion of the blank to reduce the diameter of the middle thereof, means engageable with the softened reduced portion of the blank to bend said softened portion, and means for moving said bending means in an inclined vertical path at a speed differing from that of said horizontal conveyor when said bending means is in engaging relation to said blank.

6. A machine for shaping glass droppers to form thereon offset discharge ends comprising heating means for softening a portion of a tubular blank intermediate the ends thereof, means for conveying the blank in a definite path past said heating means, drawing means positioned in the path of the conveyed blank and engageable with the blank to stretch the softened portion thereof, and weight means engaging the blank adjacent the ends thereof while the blank is being stretched to hold the blank on the conveying means and prevent sagging of the softened portion of the blank.

7. A machine for shaping glass droppers to form thereon offset discharge ends comprising heating means for softening a portion of a tubular blank intermediate the ends thereof, means for conveying the blank in a definite path past said heating means including spaced movable projections engaging the blank and a pair of longitudinal rails for supporting the blank while being conveyed, drawing means positioned in the path of the conveyed blank and engageable with the blank to stretch the softened portion thereof, and a plurality of pivoted fingers positioned above each of said rails adjacent said drawing means and adapted to engage the blank adjacent the ends thereof to hold the blank against said rails and prevent sagging of the softened portion of the blank.

8. A device for bending softened glass articles comprising a block and a perforated plate secured to said block, said plate having converging sides merging into a curved apical portion, said apical portion being spaced from said block.

9. Mechanism for drawing tubular glass articles having lipped ends comprising a pair of supports, a plate pivotally connected to each support, a pair of spaced guide members secured to each plate and angularly disposed thereto to provide opposite diverging guides, means for varying the angle between said plate and said support, and means for moving the lipped ends of the glass articles into engaging relation with said guide members to be guided thereby.

10. The method of shaping a tubular glass blank which consists in the following steps: first, heating the blank intermediate its ends to soften the middle portion of the blank, then drawing the softened portion to reduce the diameter thereof, then bending the blank to a substantial V-shape, and finally cutting the blank at the apex of the bent blank.

11. The method of shaping a tubular glass blank which consists in the following steps: first, moving the blank in a definite path, heating the blank intermediate its ends while it is moving along said path to soften the middle portion of the blank, then drawing the softened portion while the blank is moving to reduce the diameter thereof, then lifting the blank while still soft and supporting the blank only at its softened portion to permit the ends of the blank to fall by gravity, the blank being thereby bent to angular form, and finally cutting the blank at the bent portion thereof.

CHARLES G. ANASTOR.